United States Patent [19]
Giles
[11] 3,984,017
[45] Oct. 5, 1976

[54] SELF-EMPTYING CONTAINER

[76] Inventor: Norman W. Giles, 23028 - 74th Ave., R.R. 6, Langley, British Columbia, Canada

[22] Filed: Feb. 18, 1975

[21] Appl. No.: 550,567

[52] U.S. Cl. .................. 214/307; 214/313
[51] Int. Cl.² .................. B65G 65/04
[58] Field of Search .................. 214/42.26, 300, 302, 214/303, 312, 313, 314, 315, 316, 317, 318, 307, 706, 714, 660, 620, 621; 298/17 R, 23 R, 23 S, 23 A, 23 F, 23 D, 23 DF

[56] References Cited

UNITED STATES PATENTS

| | | | |
|---|---|---|---|
| 1,522,162 | 1/1925 | Welton | 298/23 B |
| 1,538,127 | 5/1925 | McKinley et al. | 298/23 A |
| 1,650,815 | 11/1927 | Barrett | 298/11 |
| 2,478,462 | 8/1949 | Decker | 214/704 |
| 2,482,692 | 9/1949 | Quales et al. | 214/706 |
| 2,738,222 | 3/1956 | Needham | 214/620 |
| 3,270,900 | 9/1966 | Sherman | 214/620 |
| 3,486,648 | 12/1969 | Wald | 214/620 |
| 3,656,643 | 4/1972 | Keneson et al. | 214/315 |
| 3,877,593 | 4/1975 | Sleziak | 214/315 |

*Primary Examiner*—L. J. Paperner
*Assistant Examiner*—Lawrence J. Oresky
*Attorney, Agent, or Firm*—Fetherstonhaugh & Co.

[57] ABSTRACT

A dumpable container. The container includes a supporting chassis having a rest position. A container chassis is pivotally mounted on the supporting chassis and swingable about a transverse axis located in front of a lateral equilibrium axis of the container chassis. The position of the pivotal mounting of the container chassis relative to the equilibrium axis retains the container chassis in a rest load-receiving position when the supporting chassis is in its rest position. When the supporting chassis is tipped forwardly, the pivotal mounting of the container chassis is shifted relative to the equilibrium axis to permit the container chassis to tip forwardly to an unloading position. The return of the supporting chassis to its rest position causes the container chassis to return to the load-receiving position.

15 Claims, 5 Drawing Figures

Fig.1.
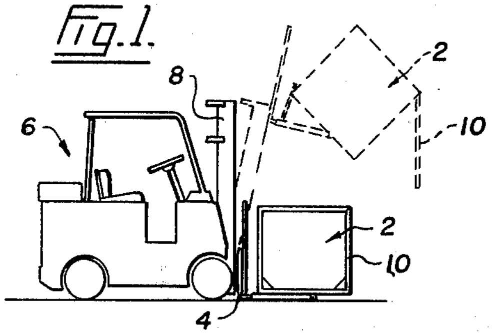
Fig.2.
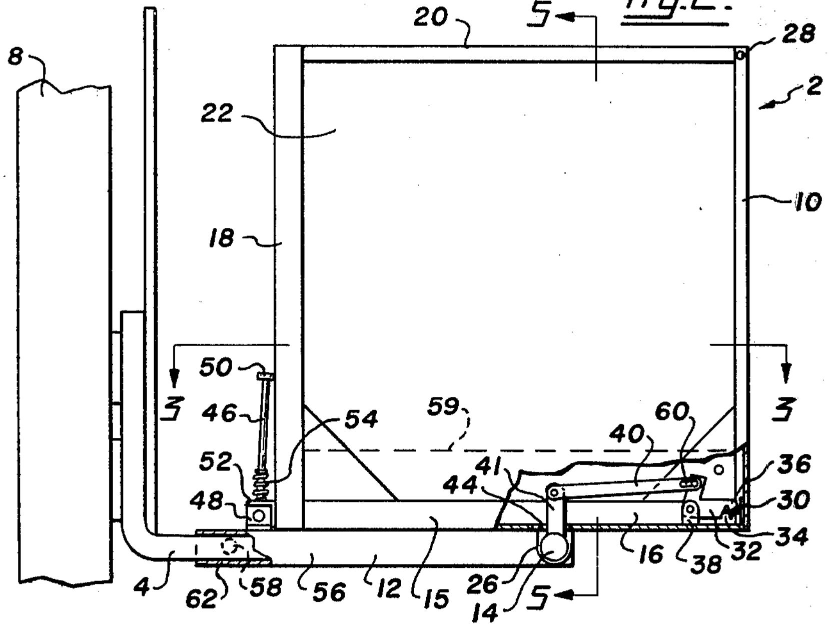
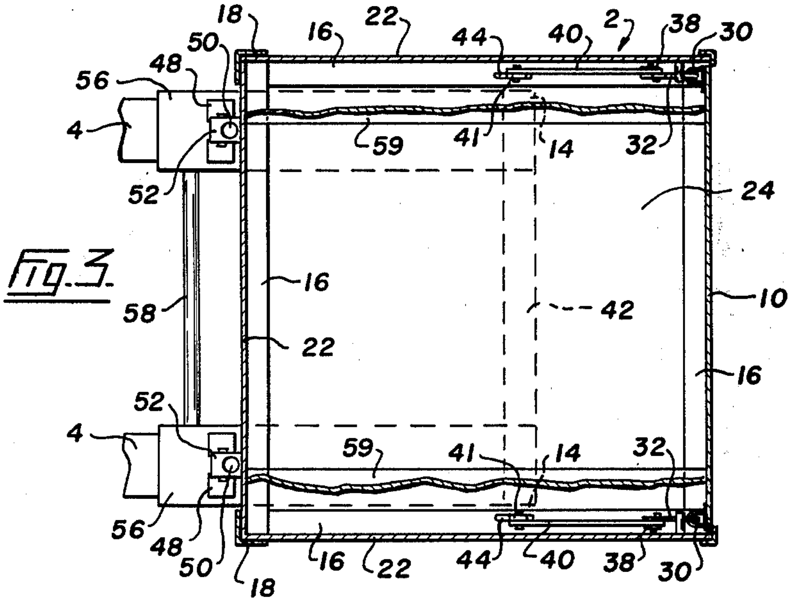
Fig.3.

SELF-EMPTYING CONTAINER

FIELD OF THE INVENTION

This invention relates to containers, and more particularly, to containers that can be easily dumped.

PRIOR ART

It is well established to use containers at factories and workshops so that waste material and rubbish can be placed in these containers. The containers can then be collected and taken to a dumping place where they can be emptied.

Self opening containers are also known. The underlying idea behind such containers is to limit the amount of manpower necessary to empty the containers. Thus, it is desirable that such containers can be emptied without it being necessary to have people to open the container and, still more preferably, without it being necessary for the driver of the vehicle carrying the container to leave the vehicle.

To permit this, it is fairly common in the prior art to use hydraulic rams and chain links to release a catch and permit the door to open. Typically such prior art containers have required special modification of the dumping truck in order to ensure the proper operation of the containers.

SUMMARY OF THE INVENTION

The present invention provides a container that, in its preferred embodiment, can be carried on an unmodified fork-lift truck and can be emptied by simple tipping of the container. In addition, the container can be emptied in the simple manner at any elevation attainable by the fork-lift truck.

A container according to this invention comprises a supporting chassis having a rest position; and a container chassis pivotally mounted on the supporting chassis and swingable about a transverse axis located in front of a lateral equilibrium axis of the container chassis, the position of the pivotal mounting of the container chassis relative to the equilibrium axis retaining the container chassis in a rest load-receiving position when the supporting chassis is in the rest position thereof, whereby, when the supporting chassis is tipped forwardly, the pivotal mounting of the container chassis is shifted relative to said equilibrium axis to permit the container chassis to tip forwardly to an unloading position, and the return of the supporting chassis to the rest position thereof causes said container chassis to return to the load-receiving position.

More specifically, the present container comprises a first chassis, journals at the front corners of the first chassis; a second chassis including a base, the second chassis defining a container body, bearings on the second chassis engaging the journals on the first chassis to enable the second chassis to pivot relative to the first chassis around a pivotal axis in front of the lateral equilibrium axis of the base of the second chassis, a door hingedly attached to the front of the second chassis remote from the base, first engagement means adjacent the lower edge of the door, second engagement means mounted on the second chassis and engageable with the first engagement means, the first and second engagement means being adapted to latch on contact, a pivotal mounting for the first or second engagement means, a link pivotally attached to both the first chassis and the pivotal engagement means, and means to restrict the amount of pivotal motion of the second chassis relative to the first chassis. Upon forward tipping of the container with the first and second engagement means engaged, the second chassis pivots forward relative to the first chassis so that the pivotal link pivots out of engagement with the other link to open the door. Upon returning the first chassis to the level, the second chassis pivots backwardly relative to the first chassis, the door swings to the closed position and, upon contact, the engagement means re-engage.

In a preferred embodiment the second engagement means are mounted pivotally on the second chassis. Desirably the second engagement means is a latch having an indent adapted to engage a loop mounted adjacent the lower edge of the door and constituting the first engagement means. The latch preferably has an inclined end surface to facilitate re-engagement with the loop. Also, to facilitate re-engagement with the loop, the link may be connected pivotally to the latch by means of an elongated aperture formed in it. This ensures that the latch can move backwardly relative to the link. That is, the latch can be moved upwardly to permit the indent to engage the loop without the link moving backwardly.

The means to restrict the amount of pivotal motion of the second chassis relative to the first is necessary to ensure that the second chassis does not move so far forward relative to the first chassis that a return to the level position of the first chassis will be insufficient to return the second chassis to its rest position in which its door is closed. Means to restrict the amount of pivotal motion of the second chassis relative to the first may comprise a rod pivotally mounted on the first chassis and formed with a head. A bracket on the second chassis engages with the rod and the amount of relative motion is then restricted by the head contacting the bracket on the second chassis.

BRIEF DESCRIPTION OF THE DRAWINGS

One embodiment of the invention is illustrated in the accompanying drawings, which are by way of example only. In these drawings, FIG. 1 illustrates the emptying of a container according to the present invention by a fork-lift truck, FIG. 2 is an elevation, partly in section, of a container according to the present invention mounted on the fork of a fork-lift truck, FIG. 3 is a section along the line 3—3 of FIG. 2.

DESCRIPTION OF THE PREFERRED EMBODIMENT

Figure 4:
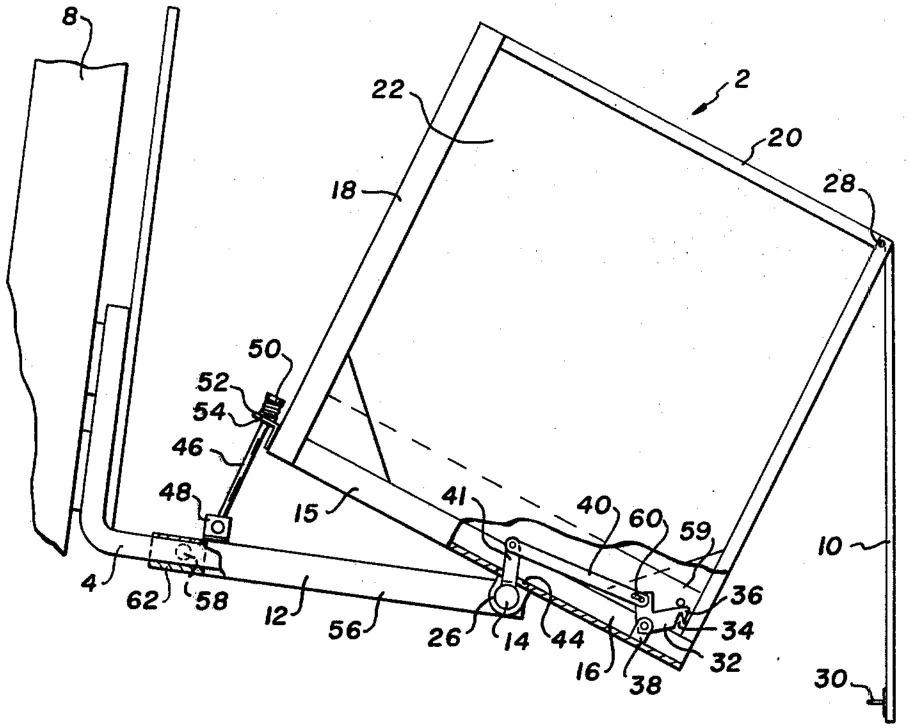
FIG. 4 is a side elevation, partly in section, similar to FIG. 2 but in which the container is in the tip position.

In the drawings, FIG. 1 illustrates a container 2 mounted on the fork 4 of a fork-lift truck generally designated 6. The truck is fitted with a tower 8 and the forks 4 move up this tower 8. The tower 8 can be tipped forwardly, as shown in dotted lines in FIG. 1. As indicated in FIG. 1 raising of the container 2 on the forks 4 followed by tipping of the tower 8 forwardly causes the door or gate 10 of the container 2 to open.

Figure 5:
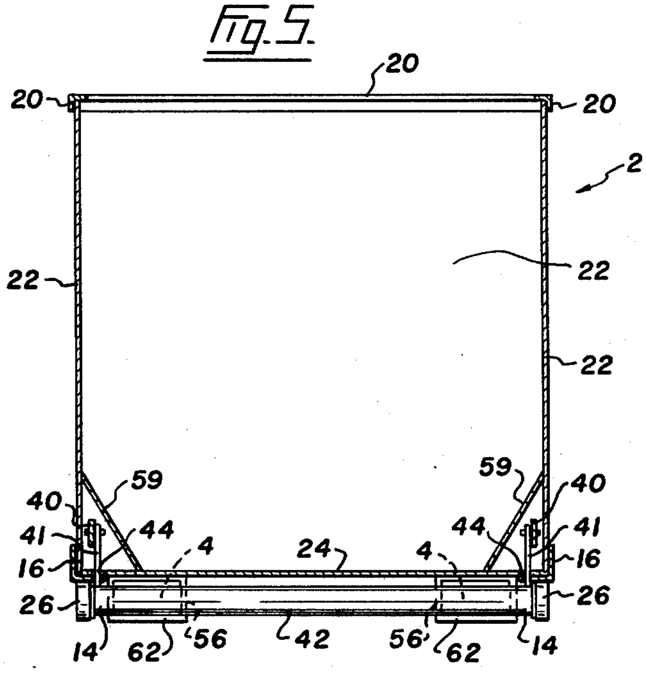
FIG. 5 is a section along the line 5—5 in FIG. 2.

FIG. 2 is more detailed and shows that the container 2 comprises a first or supporting chassis 12 having journals 14 (as best shown in FIG. 5) at its front corners.

A second or container chassis 15 is formed by horizontal base members 16, vertical corner pieces 18 and horizontal top members 20. These members 16, 18 and 20 define the edges of the container body. The container body is completed by side panels 22 and the floor 24.

The first chassis 12 is provided with bearings 26 depending from base members 16 and engaging the journals 14 on the first chassis. These bearings enable the second chassis to pivot relative to the first chassis 12 around a pivotal axis that is in front of the lateral equilibrium axis of the base of the second chassis as defined by the base members 16. The door or gate 10 is hingedly attached to the front of the second chassis at 28, which is remote from the base.

Latching means is provided between gate 10 and container chassis 15, said latching means automatically unlatching and latching when the container chassis is tipped forwardly and back relative to supporting chassis 12. This latching means includes first engagement means in the form of loops 30 mounted adjacent the lower edge of the door 10, and second engagement means in the form of latches 32 mounted on the second chassis each provided with an indent 34 to engage the adjacent loop 30. Each latch 32 also has an inclined end surface 36 which facilitates re-engagement of the loop 30 and the latch 32 in a manner well known in the latch art.

There is a latching arrangement at each side of container 2, and as these are identical, only one will now be described in detail. Latch 32 is pivotally mounted on a lug 38 which is attached to the second chassis base member 16. Releasing means is connected to the latch and to the supporting chassis. In this example, latch 32 is pivotally connected to a link 40 which, at the end remote from the latch 32 is pivotally connected to a lug 41 secured to a cross member 42 on the first chassis. The ends of this chassis cross member 42 are the journals 14. As indicated particularly in FIGS. 2 and 4, the lug 41 extends freely through an aperture 44 in the lower base member 16.

The illustrated container has means to restrict the amount of pivotal motion of the second chassis 15 relative to the first chassis 12. In this example, similar restricting means are provided near each side of the container, and only one of these will be described in detail. A rod 46 is pivotally mounted in a bracket 48 attached to the first chassis 12. The rod 46 is formed with a head 50. The rod 46 engages with a bracket 52 attached to an upright member 18 on the second chassis. The restriction of the forward tipping movement of the second chassis relative to the first chassis is controlled by the rod 46 and the bracket 52 as best illustrated in FIG. 4. A spring 54 is mounted on the rod 46 between the head 50 and the bracket 52 to absorb the shock when the forward tipping movement of the container is stopped by head 50.

The first chassis 12 is made up of side members 56 shaped and spaced to engage the forks 4 of the fork-lift truck, and cross members 42 and 58. Side members 56 are provided with back plates 62.

In the illustrated embodiment, and indeed as preferred in the invention, the container 2 has latches 32 and loops 36 and the associated operating mechanism on both sides of the container. However, the apparatus will function with a loop and latch arrangement at one side only of the container.

It is desirable to provide panels 59 in the base of the container 2 to prevent the contents of the container from jamming the latches 32 or the links 40.

In operation, once the container is full the side members 56 of the first chassis are engaged by the forks 4 of the fork-lift truck 6. The fork-lift truck can then take the container to a suitable dumping place. Once there the fork-lift truck lifts the container 2 to the necessary level to be dumped, one position being shown by dotted lines in FIG. 1. The tower 8 is inclined forwardly to cause the container 2 to tip in the same direction. As the second chassis 15 tips forwardly the lugs 41, being fixed to the first chassis 12, retain their positions. The links 41 thus pull on the latches 32 to pull them out of engagement with the loops 30, allowing door 10 to swing open. The amount of tipping of the container or second chassis 15 relative to the first chassis 12 is controlled by the rod 46 cooperating with the bracket 52. Once the contents of the container have moved out through the open door 10, the tower 8 of the fork-lift truck is returned to a substantially vertical position. Because the pivotal axis defined by the journals 14 is in front of the lateral equilibrium axis of the base of the container 2, the container reverses to the level position. As it does, the door 10 closes and the loops 30 contact the latches 32. Normally the loops 30 will contact the latches 32 when the latches have already moved back to a position at least close to the position shown in FIG. 2. However, each loop 30 contacts an adjacent inclined surface 36. The link 40 is provided with an elongated aperture 60 so that the loop 30 cooperating with the inclined surface 36 can move the latch 32 upwardly, without movement of the link 40 and engage with the indent 34.

The container of the invention can thus be emptied and the door reclosed without the driver of the fork-lift truck moving from the seat of the truck. The back-plates 62 of the chassis side members 56 prevents the first chassis 12 from tipping upon inclination of the tower 8.

The illustrated container is preferably provided with steel chassis members, but the door, side members and floor can, for most applications, be of wood. However, they may also be made of metal or other suitable material.

What I claim is:

1. A dumpable container comprising a supporting chassis having a rest position;

a container chassis pivotally mounted on the supporting chassis and swingable about a transverse axis located in front of a lateral equilibrium axis of the container chassis, the position of the pivotal mounting of the container chassis relative to the equilibrium axis retaining the container chassis in a rest load-receiving position when the supporting chassis is in the rest position thereof, a gate swingably mounted near an upper edge thereof in the container chassis and forming a wall of the latter, latching means normally latching the gate closed and comprising a loop and a pivotally mounted latch between the container chassis and the gate, said latch releasably engaging the loop, releasing means comprising a link pivotally connected at one end to the latch and at an opposite end to the supporting chassis, so that said link disengages the latch from the loop when the container chassis is tipped forwardly to permit the gate to swing open and re-engages said latch with said loop when the container chassis returns to the normal position thereof to latch the door closed, whereby, when the supporting chassis is tipped forwardly, the pivotal mounting of the container chassis is shifted relative to said equilibrium axis to permit the container chassis to tip forwardly to an unloading position and said link to disengage said latch from said loop and the return supporting chassis to the rest position thereof causes said container chassis to return to the load-receiving position and said link to re-engage said latch with said loop.

2. A dumpable container as clamed in claim 1 including means to restrict the amount of tipping movement of the container chassis to the supporting chassis.

3. A dumpable container as claimed in claim 1, including means to restrict the amount of tipping movement of the container chassis to the supporting chassis, comprising a rod pivotally mounted on the supporting chassis,
a head on a free end of the rod, and
a bracket on the container chassis and slidable on the rod.

4. A dumpable container as claimed in claim 1, including means to restrict the amount of tipping movement of the container chassis to the supporting chassis, comprising a rod pivotally mounted on the supporting chassis,
a head on a free end of the rod,
a bracket on the container chassis and slidable on the rod, and
a spring on the rod between the bracket and said head.

5. A container comprising a first chassis;
journals at the front corners of the first chassis;
a second chassis including a base, the second chassis defining a container body;
bearings on the second chassis engaging the journals on the first chassis and located so as to enable the second chassis to pivot relative to the first chassis around a pivotal axis in front of the lateral equilibrium axis of the base of the second chassis, said second chassis normally remaining in a load-receiving position when the first chassis is in a normal position thereof;
a door hingedly attached to the front of the second chassis remote from the base;
a loop on the door adjacent the lower edge thereof;
a latch pivotally mounted on the second chassis and having an indent to engage said loop;
the loop and latch being adapted to latch on contact;
a link pivotally attached to both the first chassis and the latch; and
means to restrict the amount of pivotal motion of the second chassis relative to the first chassis;
whereby, upon forward tipping of the first chassis with the loop and latch engaged, the second chassis pivots forwardly relative to the first chassis so that the pivotal link causes the latch to disengage the loop to allow the door to open and, upon the returning of the first chassis to the normal position thereof, the second chassis pivots backwardly relative to the first chassis, the door swings to the closed position and, upon contact, the latch re-engages the loop.

6. A container as claimed in claim 5 in which the latch has an inclined end surface to facilitate reengagement with the loop.

7. A container as claimed in claim 5 in which the link is connected pivotally to the latch by means of an elongated aperture formed in the link whereby the latch can move backwardly relative to the link to facilitate reengagement with the loop.

8. A container as claimed in claim 5 in which the journals at the front corners of the first chassis constitute the ends of a cross-member of said first chassis extending beyond the sides of the first chassis.

9. A container as claimed in claim 5 in which the first chassis has side members that are adapted to engage the forks of a fork lift truck and to remain in place on the fork while the container is tipped forwardly.

10. A container as claimed in claim 5 in which the second chassis comprises four base members, corner pieces and four top members to define a rectangular section container.

11. A container as claimed in claim 10 in which the second chassis has attached to it a floor and side members forming the container body.

12. A container as claimed in claim 5 in which the means to restrict the amount of pivotal motion of the second chassis relative to the first comprises a rod pivotally mounted on the first chassis and formed with a head; a bracket on the second chassis engaging with the rod, the amount of relative motion being restricted by the head contacting the bracket on the second chassis.

13. A container as claimed in claim 12 in which the rod has a spring mounted on it between the head and said bracket.

14. A container as claimed in claim 5 in which there is a link mounted at each side of the second chassis.

15. A container as claimed in claim 13 provided with a protection panel for the latch and the link to prevent their being jarred by the contents of the container.

* * * * *